Oct. 3, 1961 J. R. VYCE 3,002,419
ALIGNMENT THEODOLITE
Filed Nov. 13, 1957 5 Sheets-Sheet 1

INVENTOR.
JOSEPH RICHARD VYCE
BY
ATTORNEY

Oct. 3, 1961  J. R. VYCE  3,002,419
ALIGNMENT THEODOLITE
Filed Nov. 13, 1957  5 Sheets-Sheet 3

6

7

8

INVENTOR.
JOSEPH RICHARD VYCE
BY
ATTORNEY

United States Patent Office 3,002,419
Patented Oct. 3, 1961

3,002,419
ALIGNMENT THEODOLITE
Joseph Richard Vyce, Ridgefield, Conn., assignor to The Perkin-Elmer Corporation, Norwalk, Conn., a corporation of New York
Filed Nov. 13, 1957, Ser. No. 696,257
11 Claims. (Cl. 88—14)

This invention relates to an optical system for detecting extremely small angular changes and translations of a body from a desired spatial position. More particularly, embodiments of the present system are especially well suited to monitor the position of a body and produce an output signal correlated in both sense and amplitude to the deviation of that body from a desired position.

In accordance with the concept of the present invention, the deviation of a body from a desired position may be detected as to two types of movement: Rotation about an axis and translation along an axis perpendicular to the rotation axis.

As will be disclosed and explained more fully hereinafter, the present invention makes it possible to detect both rotation and translation as described above by producing separate signals, one of which is an accurate measure of rotation and the other a measure of the translation. The present invention has numerous applications, such as positioning optical elements in large telescopes, monitoring the sway and twist of large structures in the form of tall buildings or bridges, for instance, as well as establishing and monitoring the attitude in space of gyroscopically or otherwise stabilized platforms.

The present invention achieves its purpose by transmitting coded radiant energy, usually in the form of visible light, to two reflective elements rigidly affixed to the body which it is desired to observe. The reflective elements affixed to the body are conveniently small and may be readily adapted to be mounted on many types of bodies, the position of which it is desired to monitor.

One of the elements is usually of such configuration as to be capable of reflecting radiant energy at angles varying commensurately with the change of the angle of incident light about a first axis, but being insensitive to angular changes about a second axis. By the use of such a reflective element, the information contained in the reflected signal is confined to angular variation of the body about a single axis where that information may be all that is required, either because movement in other directions is not of significance, or may be measured readily by other means. Radiation-sensitive means positioned to receive the reflected energy produces an output signal which is a measure of the deviation of the body from a desired position. This combination of elements may be referred to as the rotation detecting portion of the system.

A second reflective element may be of the same type as that described above but mounted on the body which is under observation so as to reflect radiant energy at angles varying commensurately with the change of the angle of incident light about the second axis, but insensitive to angular changes about the first axis. Alternatively, a retroflector which is insensitive to any angular changes in incident light may be employed. A second radiation-sensitive means is positioned to receive energy reflected by the second reflective element and produce a second output signal which is a measure of the translation of the body along an axis perpendicular to the rotational axis previously mentioned. This combination of elements may be referred to as the sway detecting portion of the system.

The sway detecting portion of the system also includes a constant deviation optical device which not only transmits the coded energy to the reflective elements affixed to the body being monitored, but also transmits reflected energy from the second reflective element to the second radiation-sensitive detector. The coaction of the constant deviation reflector with the other elements of the system and the advantages derived from its use will be apparent from the more detailed description of the several embodiments disclosed hereinafter.

One of the usual requirements of apparatus of this kind is that it operate efficiently and successfully under daylight conditions as well as in darkness. Some prior art devices were capable of detecting changes in light reflected by an element affixed to the body being monitored, but only under nighttime conditions. A system which possesses the desirable capabilities must therefore be operable even under conditions of strong ambient illumination.

The principal object of the present invention is to overcome the limitations of prior art devices and to monitor the position of a body with a high degree of accuracy.

An ancillary object of the present invention is the detection of any movement of a body from a desired position, and the production of a signal having an amplitude related to the extent of its deviation from a desired position and having a sense related to the direction of movement.

Another object of the present invention is the detection of several kinds of movement such as rotational movement and lateral movement, and the production of separate output signals commensurate with each kind of movement.

Other features and objects of the present invention will appear more fully from an understanding of the operation of typical embodiments illustrated in the drawings in which.

Figures 1, 2:
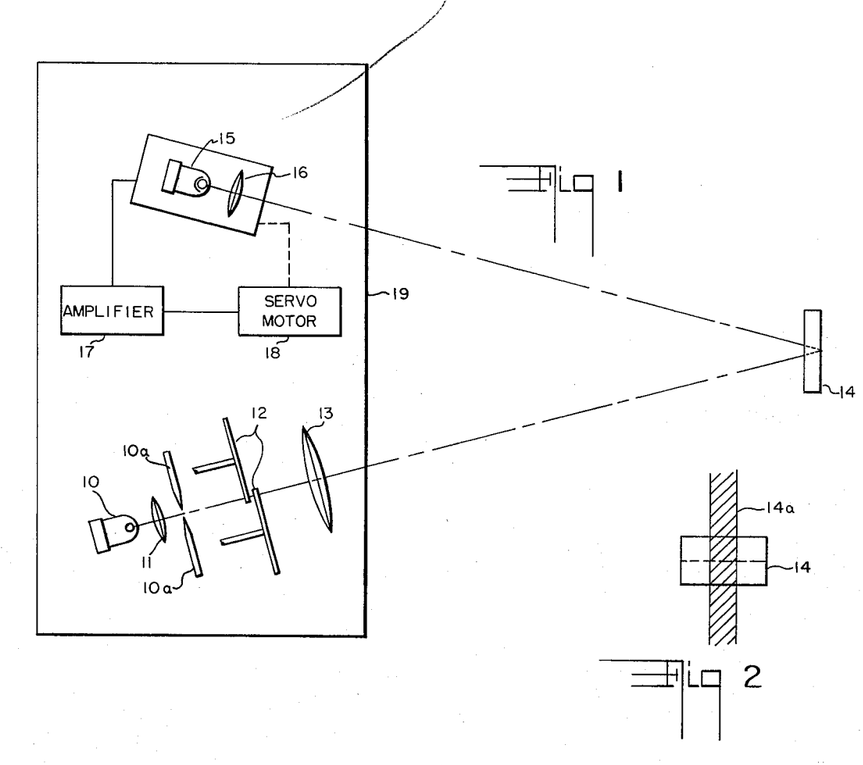
FIG. 1 is a schematic representation of an embodiment of the present invention which may be used to detect rotational movement of a body.
FIG. 2 is an illustration of a reflective element which is rigidly affixed to the body to be observed in accordance with the present invention.

The embodiment of FIG. 1 includes a source of radiant energy 10 such as a concentrated arc lamp which provides an intense beam of visible light. An appropriate lens 11 may be placed before the radiant energy source 10 to reimage that source at the point where the radiant energy is coded. The energy may be coded by arranging different colored filters, such as red and green, in the path of the light beam so as to divide the radiant energy into two distinguishably colored portions.

Another way of coding the light from the source 10 is to arrange choppers 12 as shown in FIG. 1 to alternately chop contiguous portions of the beam in a known phase relationship and at a known frequency. The light thus coded is transmitted through a primary source lens 13 and directed to a reflective element 14 rigidly affixed to the body, the position of which is to be monitored. When either color (wavelength) coding, or on-off time coding with choppers as in FIG. 1 is used, it is important that the coding action take place effectively at the source lens 13, rather than at the radiant energy source 10, and that the dividing line (boundary) between the differently coded halves of the radiation beam be parallel to the rotation axis of interest (perpendicular to the drawing plane in FIG. 1). In the system of FIG. 1, the image of the slit-limited radiant energy source 10 at the roof reflector 14 is formed alternately by the right and left halves of the source lens 13. Although this coding would most efficiently be performed with the choppers 12 operating immediately adjacent to the source lens 13, in practice the small slit dimensions and limitations on chopper size make it both possible and convenient to effect this coding with the choppers considerably removed from the source lens 13.

Because the vertical extent of the light beam at the choppers 12 in practice is not great, relatively small circular choppers may be used as in FIG. 1 to produce the specified chopping action. A single circular chopper may also be used instead of the two choppers 12 shown. Alternatively, rotating or oscillating choppers in many possible variations can perform this function.

Not infrequently, the movement of a body about one particular axis is of prime interest and significance, while other movements may be disregarded or detected by other means. The embodiment of FIG. 1 is designed to detect rotational changes about a single axis. The reflector 14 is therefore of a kind which will reflect radiant energy at angles varying in accordance with the change of the angle of incidence of light in a plane parallel with the plane of the drawing. As related to the plan view of the system shown in FIG. 1, and as most frequently arranged, that plane is horizontal. The system is rendered insensitive to changes of the angle of incidence along a vertical direction by employing a roof reflector 14 having its apex horizontally oriented.

A roof reflector 14 of prismatic form is illustrated in FIG. 2. The prism 14 is a convenient form of roof reflector because it provides two reflecting surfaces in a unitary element. However, two mirrors having their reflective surfaces oriented in substantially the same relationship as the internally reflecting surfaces of the prism 14 are equally capable of rendering the system insensitive to changes of the angle of incidence along a vertical direction. Thus, if the beam of light which is directed to the reflective element 14 illuminates the entire vertical dimension of the reflector on the body, as illustrated by the shaded area 14a of FIG. 2, the only angular changes in the reflected light will be those which are caused by changes in the angle of incidence of the light along a horizontal axis.

In the system of FIG. 1, a radiation-sensitive device 15 is positioned so as to receive the reflected energy and produce an output signal which is commensurate with the instantaneous intensity of the light impinging thereon. An appropriate lens 16 may be positioned to concentrate the reflected energy on the radiation detector 15.

If the rotation instrument and the roof reflector have fixed relative locations with respect to translation, there is no need for a slit 10a in the light path since the edges of the reflector 14 provide the necessary horizontal limits for the light beam at the reflector 14 which are fixed with respect to the rotation system.

However, in the general case, the rotation instrument and the roof reflector 14 do not have their relative locations fixed within the limits necessary to achieve the required rotation measurement accuracy. As a result, the horizontal extent of the light beam at the reflector 14 must be determined by means which will remain fixed with respect to the rotation system. A slit 10a at the source beaming lens conjugate focus of the reflector 14 can constitute this means and a system incorporating this means is shown in FIG. 1. This arrangement permits accurate measurement of reflector rotation about an axis perpendicular to the plane of the drawing in the presence of reflector translation in any direction as long as the full width of the slit 10a in the drawing plane falls on the reflector.

Therefore, whenever the single axis rotation of a nonstationary body must be measured, a system of the type in FIG. 1 may be used for the measurement if the roof reflector width can be made equal to or greater than the total of body travel parallel to a line perpendicular to the reflector rotation axis and the rotation system-to-reflector line-of-sight plus the slit image width. The nominal slit image width for operation up to 1000 feet is about one and one-half inches, but this can be either decreased or increased depending on the specific application. The height of the slit image (perpendicular to its width) can be made as large as required to encompass the maximum body translation in the direction of the reflector rotation axis.

Thus, the rotation system of FIG. 1 will provide highly accurate rotation measurement in the presence of roof reflector translation if the reflector 14 can be made somewhat wider than the maximum translation in the direction indicated. However, in some cases, the roof reflector width is limited to less than its maximum possible translation and, in order to accurately measure its rotation, it becomes necessary to provide a means for measuring the amount of translation and moving the rotation system in approximate correspondence with the translation in the manner to be described below.

In accordance with the teaching of the present invention, the radiation-sensitive device 15 has a response correlated to the initial coding of the light energy. If the energy is originally color-coded in red and green light, two radiation-sensitive detectors may be used, one of which is responsive only to red light and the other only to green light. The relative output signals of the detectors 15 will therefore be a measure of the angular deviation of the body from a desired position as represented by a pre-established ratio of red and green light.

Similarly, if the light energy is initially coded by chopping equal portions, deviation of the body from a position in alignment with the principal axis of the path of the optical system will be indicated by a state of unbalance between the two chopped portions of light energy reaching the detector 15. When the unbalanced output signal of the radiation-sensitive means 15 is compared with a signal having a known time-phase relationship to the chopping operation, the sense of the rotation of the body can be discerned, i.e., whether the body has moved clockwise or counter-clockwise about a vertical axis.

Figures 3, 4, 5:
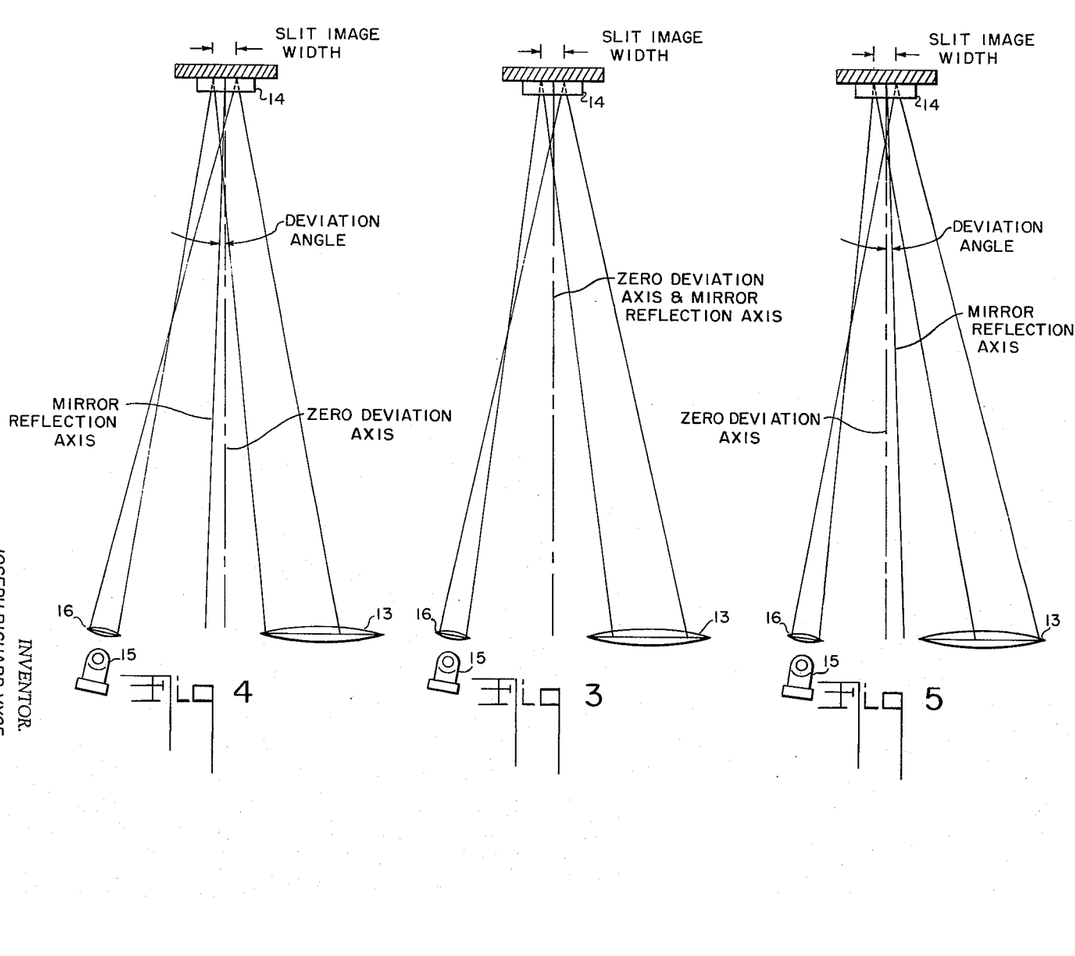
FIGS. 3, 4, and 5 illustrate three different operative conditions of the system of FIG. 1.

The optical schematic diagrams of FIGS. 3, 4, and 5 illustrate three typically different operative conditions of the system of FIG. 1.

Components shown in FIGS. 3, 4, and 5 bear the same numerical designation as in the complete system of FIG. 1. In these three schematic drawings, the roof reflector 14 may be considered to have its apex in the plane of the drawing. Comparable elements in FIGS. 3, 4, and 5 bear the same numerical designations as in FIG. 1.

In FIG. 3, the detector 15 which receives the energy transmitted through lens 16 may be said to "look" at the primary source lens 13 by means of the roof reflector 14. The detector 15 receives energy through the slit image located at the roof reflector 14, as indicated in the drawing. When a plane perpendicular to the roof reflector apex at the center of the slit image bisects the distance between the center lines of the detector lens 16 and the primary source lens 13, this roof reflection plane intercepts the drawing plane in what may be called the zero deviation axis and the detector 16 will receive equal amounts of energy from the right- and left-hand sides of the primary source lens 13 as in FIG. 3.

FIG. 4 illustrates the condition where the body under observation has changed position so that the roof reflector 14 has rotated about an axis perpendicular to the drawing. As shown by the optical schematic of FIG. 4, the detector aperture 15 now receives more energy from the left side of the primary source lens 13 than its right side. The roof reflection axis has deviated to the left and no longer coincides with the zero deviation axis as established in FIG. 3. The angle between the two axes may be designated as the deviation angle as indicated in FIG. 4. In both of FIGS. 4 and 5 the rotation of reflector 14 is so slight that it has not been illustrated.

FIG. 5 illustrates the condition which is the converse of that of FIG. 4. The body undergoing observation has rotated so that the detector aperture at 15 receives more energy from the right side of the primary source lens 13 than the left side. The deviation angle indicates the amount of rotation of the body under observation.

Figure 6:
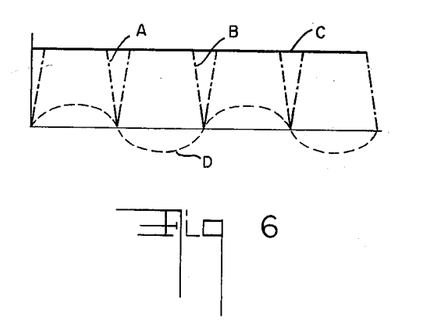
FIGS. 6, 7, and 8 illustrate typical output signals produced by the system of the present invention.
Figure 7:
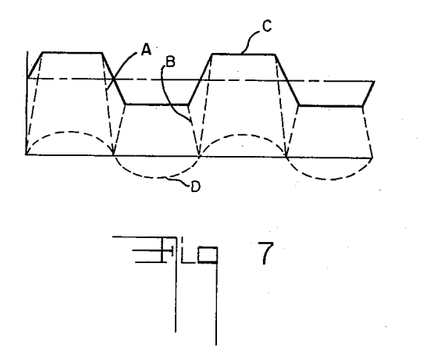
Figure 8:
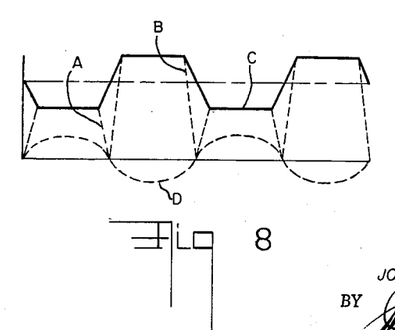

FIGS. 6, 7, and 8 illustrate the kinds of output which are produced by the detector 15 under the three typical conditions optically illustrated in 3, 4, and 5, respectively.

FIG. 6 illustrates the signal produced by the condition illustrated in FIG. 3 where the amplitude of output of the radiation-sensitive detector 15 due to light received from the left side of the primary source lens 13 is equal in amplitude to the output of the radiation-sensitive detector 15 due to light received from the right side of the primary source lens 13. A net null waveform C is the result. The sine wave D is a reference signal related to the coding operation.

FIG. 7 illustrates a state of unbalance which exists in the output of the radiation-sensitive detector 15 due to rotational deviation of the body under observation. It will be noted that the output waveform A of the detector 15 due to light received from the left side of the primary source lens 13 is considerably larger in FIG. 7 than the output waveform B due to light energy received from the right side of the source lens 13. The total detector output waveform C therefore has an A.C. component, the amplitude of which is a measure of the amount of rotational deviation of the body under observation. The phase of the A.C. waveform C with respect to reference waveform D is indicative of the direction in which the body under observation has moved.

FIG. 8 illustrates the converse condition where the amplitude of the output waveform A due to light received from the left side of the primary source lens 13 is considerably less than the waveform B produced by light received from the right side of the primary source lens 13. Accordingly, the net detector output waveform C is an A.C. signal which has an amplitude proportional to the amount of rotational movement of the body and a phase which, when compared to the reference waveform D, is indicative of the direction of such movement. The net output waveform C of FIG. 8 is 180° out of phase with the net output waveform C produced by the detector 15 as illustrated in FIG. 7 and therefore indicates movement in the opposite direction.

If desired, the output signal of the radiation-responsive means 15 can be appropriately amplified in a servo amplifier 17 as illustrated schematically in FIG. 1 and fed to a servomechanism drive means 18 which varies the position of the detector 15 to maintain the received reflected energy in a state of balance. The amount by which the detector 15 is driven relative to the base 19 to maintain a null thus becomes a measure of the extent which the body deviates from an initial position. The direction in which the detector 15 is moved in the direction of such measured deviation.

It should be apreciated and borne in mind that the illustrations employed to explain the present invention are greatly compressed for the sake of simplicity and compactness. Usually, the coded light will strike the reflective element 14 of the body at an extremely small angle of incidence. One typical application of the present invention, for instance, requires tracking the rotation of the reflective element on the body within several minutes of arc at a distance of 1,000 feet. Since the source 10 and the detector 15 are included in a unit apparatus and mounted on a common base 19, it can be appreciated that the angle subtended between the two is necessarily very small indeed. It is impractical and undesirable to illustrate such extremely small angles for purposes of explanation, but the order of magnitude of the actual angles involved in typical usage of the apparatus should be kept in mind in order to best understand the operation of apparatus embodying the present invention.

Figures 9, 10:
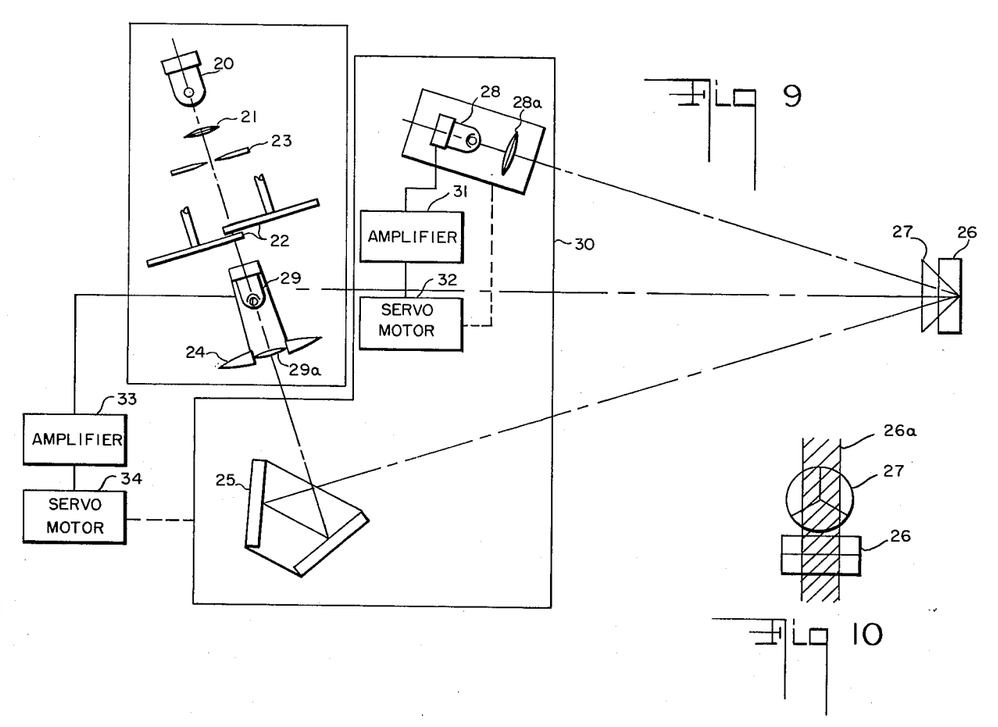
FIG. 9 is a schematic representation of another embodiment of the present invention which is capable of monitoring the deviation of a body from a desired position and distinguishing rotational movement of the body from its lateral translation.
FIG. 10 illustrates a reflective system of the kind employed in the system of FIG. 9.

FIG. 9 is an embodiment of the present invention which is capable of detecting and distinguishing between rotation and translation of the body being monitored. As illustrated schematically, this particular embodiment comprises a source of radiant energy 20, such as a concentrated arc lamp, arranged with an imaging lens 21 and chopping means 22 in much the same manner as the embodiment of FIG. 1. Appropriately positioned between the imaging lens 21 and the chopper 22 is a source slit 23. Energy transmitted through the slit 23 and coded by subsequent chopping is then transmitted by a primary source lens 24 to a constant deviation reflector 25, which may take the form of a penta prism or a penta mirror arrangement. Radiant energy, commonly in the form of visible light, is reflected out of the penta reflector 25 to first and second reflective means 26 and 27, respectively, affixed to the body which it is desired to monitor.

The first and second reflective means, 26 and 27, possess particular operative characteristics. The first reflective element 26 is of a kind which will reflect energy at angles varying commensurately with the change of angle of incidence of light along a horizontal direction, but is insensitive to changes of the angle of incidence along a vertical direction. The second reflective element 27 is of a kind which is insensitive to angular changes in a horizontal direction as well.

The first reflective element 26 of FIG. 9 is substantially the same as the reflective element 14 employed in the embodiment of FIG. 1, i.e., of a roof reflector type, the juncture of the reflective surfaces being oriented horizontally. The second reflective element 27 illustrated in FIGS. 9 and 10 is a retroflector and is capable of reflecting a radiant beam back parallel to the same path which is traversed in reaching the reflective element, regardless of changes in the angle of incidence of the light energy. This property of the retroflector 27 holds true throughout a considerable variation of the angle of incidence of the light transmitted to it and the manner in which the light thus reflected coacts with other elements in the system will appear more fully in the explanation of the typical operation of the system which follows the description of the apparatus.

Other elements of the system illustrated in FIG. 9 include two detectors 28 and 29 which are responsive to radiation impinging thereon. Light reflected from the first reflective element 26 is directed to a first radiation-sensitive means 28 which, as shown in FIG. 9, is mounted on a base 30 also supporting the penta reflector 25. It will be recalled that light impinging upon the first reflector 26 is reflected at an angle commensurate with its angle of incidence with respect to the horizontal plane.

Due to the retroflective property of the second reflective means 27, however, light which impinges upon it is transmitted back parallel to the same path it traversed in reaching the retroflector. That portion of the reflected light is, therefore, returned to the penta reflector 25 and transmitted to a second detector 29 positioned in alignment with the source 20. The system illustrated in FIG. 9 therefore has a single source of radiant energy 20 which is the information carrying means for both the rotation and translation systems.

In typical operation of the system of FIG. 9, radiant energy, usually in the form of visible light, originates at the source 20 and is imaged by an appropriate optical element, such as a lens 21, upon a source slit 23. Adjacent portions of the beam are coded by choppers 22 which permit the light incident on the source lens 24 to pass alternately through its right and left sides as described. The chopping takes place at a known and predetermined phase relationship with the reference voltage and at a constant and known frequency. The coded light is transmitted through a primary source lens 24 and falls upon the constant deviation reflector 25, whence it emerges to be transmitted to the first and second reflective elements 26 and 27 on the body whose position it is desired to monitor.

A lower portion of the beam falls upon the first reflective element 26 and the upper portion of the beam falls upon the second reflective element 27 previously described. The illumination of the first and second reflective elements 26 and 27 by the beam is indicated by the shaded area 26a as illustrated in FIG. 10. The first element 26 reflects energy to a first detector 28 in substantially the same manner as the embodiment of FIG. 1. An appropriate optical element such as a lens 28a may be used to collect the reflected energy directed to detector 28. Rotation of the body about a vertical axis will cause an unbalanced signal to be produced by the first detector 28. Thus, the first detector 28 in the system of FIG. 3 will produce a signal which is correlated in sense and amplitude to the direction and magnitude of the rotation of the body under observation.

As previously described in connection with the embodiment of FIG. 1, an amplifier 31 and an appropriate servomechanism drive means 32 may be arranged to be actuated by the output signal of the first detector 28 so as to position the first detector 28 in relation to the base 30 to maintain a predetermined state of balance or null between the two portions of the coded light energy which it receives.

The coded energy which falls upon the second reflective means, a retroflector 27, is reflected back parallel and adjacent to the same path it traversed in reaching the retroflector 27, so that it reaches the penta reflector 25 and is transmitted therethrough parallel and adjacent to its original path but in an opposite direction. The reflected energy is directed from the penta reflector 25 to a second detector 29. A lens 29a may be positioned in the path of such reflected energy to collect and concentrate it upon the detector 29.

Figures 11, 13:
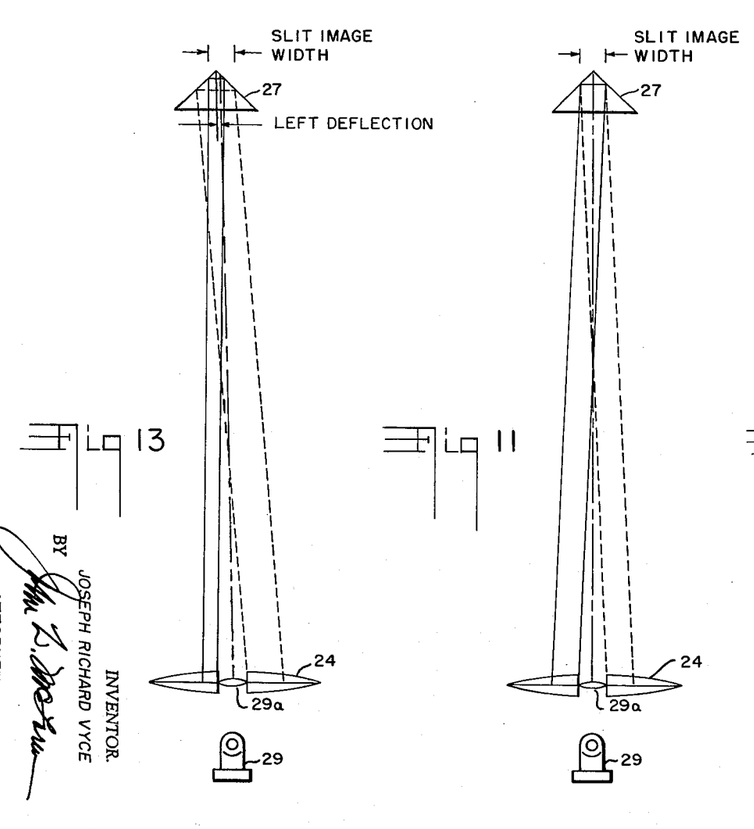
FIGS. 11, 12, and 13 illustrate three different operative conditions of one portion of the system of FIG. 9.

If the slit image is centered on the apex of the three reflecting surfaces of the retroflector 27, the second detector 29 will receive equal quantities of energy from each part of the reflected coded beam as illustrated by FIG. 11.

Figure 12:
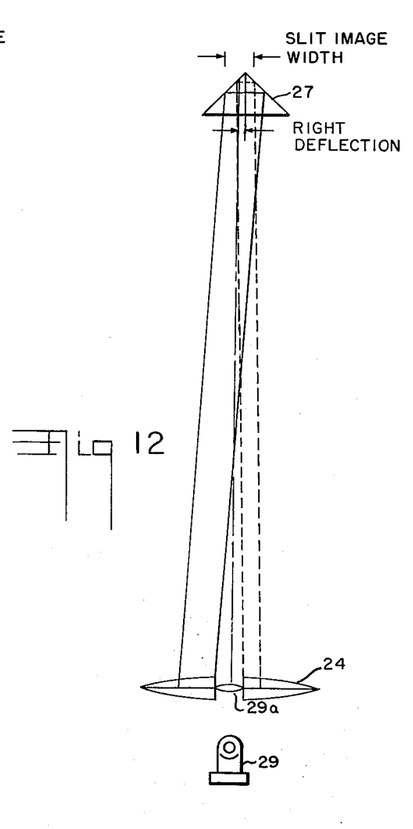

The optical schematic of FIG. 11 optically illustrates the condition of operation as it effects the second detector 29 of the system of FIG. 9 when no lateral translation of the body under observation has taken place. In FIGS. 11, 12, and 13, radiant energy from the right side of the primary source lens 24 is shown by broken lines and radiant energy from the left side is shown by solid lines.

The constant deviation reflector 25 which is included in the system of FIG. 9 in the form of a penta mirror or penta reflector has not been illustrated in FIGS. 11, 12, and 13 in order to simplify the optical diagram which is pertinent to the operation of the lateral translation detection portion of the system.

FIG. 12 illustrates the operative condition of the system of FIG. 9 under which the second detector 29 receives more energy from the left side of the primary source lens 24 than from the right side.

In FIG. 13, the converse condition is illustrated when the body under observation moves to the left. Under these conditions, detector 29 receives more energy from the right side of the primary source lens 24 than from the left side.

Rotation of the body under observation will cause no difference in the signal produced by the second detector 29, because the retroflector 27 which reflects energy to the second detector 29 has the property of being insensitive to changes in the angle of incidence of light energy impinging thereon, reflecting such light parallel to the same path by which it reached the retroflector 27.

However, if there is a lateral translation of the body being observed, the retroflector 27 is no longer illuminated symmetrically with respect to its apex in a horizontal plane and the second detector 29 will receive an increase in the amount of coded energy from one portion of the source lens, but a lesser amount from the other portion as shown in FIGS. 12 and 13. Such a signal, when amplified by a suitable amplifier 33, may be conveniently employed to actuate a servomechanism drive means 34 operatively connected with the base 30 as shown in FIG. 9. The base 30 may thus be positioned relative to the source 20 and the stationary portion of the system to maintain a known or predetermined state of balance between the two coded portions of the radiant signal.

The first detector 28 of the embodiment illustrated in FIG. 9 will produce output signals substantially the same as those illustrated in FIGS. 6, 7, and 8 in response to the radiation reflected from the first reflective element on the body under observation. The signal produced by the radiation detector 28 may be fed to a phase comparator in a manner similar to that already described and, when appropriately amplified, can be used to actuate a servomechanism drive means which will adjust the position of the first detector 28 relative to the base 30 upon which it is mounted and thus maintain a known or predetermined state of balance between the two coded portions of radiant energy received by radiation detector 28. The amount of adjustment of the first detector 28 is therefore a measure of the amount and direction of rotational deviation.

The sway or lateral translation of the body under observation is measured by the output of the second detector 29 and the state of unbalance of its output signal is correlated in amplitude to the amount of sway or lateral translation of the body, while the sense of such unbalance is indicative of the direction of lateral movement of the body.

The second detector 29 will accordingly produce an output indicative of the particular instantaneous operative condition of the system and substantially similar to one of the three typical output conditions illustrated in FIGS. 6, 7, and 8.

As illustrated in the system of FIG. 9, the lateral translation detection portions of the system may be arranged to operate on the null or constant state of balance principle by arranging for the output of the second detector 29 to be amplified in a servo-amplifier 33 and employed to actuate a servomechanism drive means 34 which positions the entire base 30 upon which the first detector 28 and the penta reflector 15 are mounted. The source 20, imaging lens 21, slit 23, chopping mechanism 22, and second detector 29 remain stationary. The image reflected from the second reflective element 27 on the body is maintained in a state of balance by proper adjustment of the position of the penta reflector 25. Thus, the extent of positional adjustment of the penta reflector 25 which is necessary to maintain a state of null or predetermined state of balance is a measure of the amplitude of lateral movement of the body under observation. The direction in which the penta reflector 25 must be moved to maintain the state of balance is indicative of the direction in which the body under observation has moved laterally.

Since the light energy received by the first detector 28 is transmitted to it by the first reflective element 26 which is insensitive to changes in the point of incidence along the horizontal axis, movement of the first detector 28 in unison with the penta reflector 25 does not affect the operation of that portion of the system as long as the light beam remains incident on the first reflective element 26.

The advantage of using a constant deviation reflector in the form of a penta prism or penta reflector as employed in the system may now be understood more readily. Those skilled in the art will appreciate that the kind of highly accurate measurements which it is the purpose of this system to achieve can be subject to large errors where the source must be moved relative to the reflective elements on the body under observation.

Assuming that a penta reflector is not used as taught by the present invention, it will be apparent that relatively large errors may be caused to appear in the output of the system by any very slight deviation in angular alignment of the source 20 during the course of its translational adjustment to maintain a state of balance or null.

A penta reflector consists of two reflectors perpendicular to a first plane. A principal plane may be defined as being any plane through the penta reflector parallel to the first plane. A common penta reflector configuration has a 45° angle between the reflecting surfaces and produces a deviation of 90° in the principal plane.

A penta reflector has the property of deviating a ray through a fixed angle in the principal plane regardless of the orientation of the reflector about an axis perpendicular to that plane. With the straight slit 23 in FIG. 9 perpendicular to a principal plane, rotation of the penta reflector about axes initially in a principal plane changes the effective angle of deviation in the principal plane by the square of the angle of rotation. Approximately seven and one-half minutes of rotation as described will change the effective angle of deviation by only one second of arc.

If errors due to this effect become important, they can be prevented by curving the slit. If the penta reflector of the system illustrated in FIG. 9 rotates excessively about the source lens axis, the slit 23 may be curved with a radius of one half the source lens focal length and concave to the right to avoid deviation errors at the mirror system 26, 27 from this cause.

A penta reflector has the property of transmitting light at a right angle to the path by which it enters the penta reflector, regardless of angular deviations of the penta reflector in translating.

If the source, such as that shown at 20 in FIG. 9 is maintained stationary and the penta reflector 25 is moved to maintain balance between the distinguishably coded portions of the beamed energy, the light will be transmitted at the same angle to the reflective elements 26 and 27 on the body under observation, regardless of slight angular changes of the base 30 supporting the penta reflector 25 and the first detector 28. Typically, such angular changes may be due, for instance, to very slight but necessary and unavoidable mechanical play in the ways upon which the base 30 is supported and movably adjusted to maintain the system null.

In the embodiment of FIG. 9, the second reflective means 27 affixed to the body under observation has been shown and described as a retroflective element which reflects energy back parallel to the same path it traverses in reaching the retroflector. In some applications, however, it may be permissable and desirable to employ as the second reflective element an optical device having the same properties as the first reflective element 26 of FIG. 9, i.e., the capability of reflecting radiant energy at angles varying commensurately with the change of angle of incident light about a first axis but being insensitive to angular changes about a second axis perpendicular to the first. When used in the embodiment illustrated in FIG. 9, a second reflective element of that kind would be oriented at right angles to the first reflective element. Incident light would be reflected by the second reflective element back upon the penta reflector in much the same manner as the operation of the retroflector 27 in FIG. 9, if the operation of the system is confined and maintained within a single plane such as a horizontal plane, for instance.

It should be appreciated that various combinations of elements can be employed to perform equivalent functions within the contemplation of the present invention. Similarly, different kinds of radiant energy may be employed where necessary or desirable. For instance, infrared, ultraviolet, or other spectral bands of radiant energy may be employed in carrying out the concept of the present invention where the use of such kinds of radiant energy is desirable because of the particular application of the apparatus embodying the present invention.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. An optical system for monitoring the position of a body, comprising a source of radiant energy, a reflective element affixed to said body, said element being adapted to reflect radiant energy at angles varying commensurately with its rotation about a first axis and being independent of its rotation about a second axis, means for directing said radiant energy from the source to said reflecting element, said means including a device for limiting the radiation divergence perpendicular to said first axis, means for coding said radiant energy adjacent said directing means to establish two distinguishable contiguous portions thereof having a boundary parallel to said first axis, radiation-sensitive means positioned to receive said reflected energy, the response of said means being correlated to said coding, whereby the output signal of said means is a measure of the angular deviation of said body from a desired position.

2. An optical system for monitoring the position of a body, comprising a source of radiant energy, a reflective element affixed to said body, said element being adapted to reflect radiant energy at angles varying commensurately with its rotation about a first axis and being independent of its rotation about a second axis, means for directing said radiant energy from the source to said reflecting element, said means including a device for limiting the radiation divergence perpendicular to said first axis, means for coding said radiant energy adjacent said directing means to establish two distinguishable contiguous portions thereof in a known state of balance as determined by a boundary therebetween parallel to said first axis, radiation-sensitive means positioned to receive said reflected energy, the response of said means being correlated to said coding, drive means operably connected to position said radiation-sensitive means, and means for feeding the output signal of said radiation-sensitive means to said drive means for maintaining said known state of balance, whereby the adjustment necessary to maintain said balance is a measure of the angular deviation of said body from a desired position.

3. An optical system for monitoring the position of a body comprising a light source, a reflective element affixed to said body, said element being adapted to reflect light at angles varying commensurately with its rotation about a first axis and being independent of its rotation about a second axis, means for directing a beam of said light from said source to said reflecting element, said means including a device for limiting the beam divergence perpendicular to said first axis, means adjacent said directing means for alternately chopping contiguous portions of said beam to establish a boundary plane therebetween parallel to said first axis, means positioned to receive the reflected light for producing a signal in response to its instantaneous intensity, means for comparing said signal with said beam chopping to produce a signal as a function of the phase difference therebetween, drive means connected to receive the output of said phase comparison means and position said light-responsive means to maintain a predetermined phase relationship, whereby the positioning adjustment of said light-responsive means is a measure of the angular deviation of said body from a desired position.

4. An optical system for monitoring the position of a body comprising a source of radiant energy, a roof reflector affixed to said body, the axis of the juncture of its reflecting surfaces extending along a first axis, means for directing said radiant energy from the source to said roof reflector, said means including a device for limiting the radiation divergence perpendicular to said first axis, means for coding said radiant energy adjacent said directing means to establish two distinguishable contiguous portions thereof having a boundary extending along a second axis perpendicular to said first axis, and radiation-sensitive means positioned to receive said reflected energy, the response of said means being correlated to said coding, whereby the output signal of said means is a measure of the angular deviation of said body from a desired position.

5. An optical system for monitoring the position of a body, comprising a source of radiant energy, a reflective element affixed to said body, said element being adapted to reflect radiant energy at angles independent of its rotation about a first axis, means for directing said radiant energy from the source to said reflective element, said means including a device for limiting the radiation in a direction perpendicular to said first axis, means for coding said radiant energy at said directing means to establish two distinguishable contiguous portions thereof having a boundary extending in a second direction parallel to said first axis and radiation-sensitive means positioned to receive said reflected energy, the response of said radiation-sensitive means being correlated to said coding, whereby the output signal of said means is a measure of the lateral deviation of said body from a desired position.

6. An optical system for monitoring the position of a body comprising a source of radiant energy, a reflective element affixed to said body, said element being adapted to reflect radiant energy at angles independent of its rotatation about a first axis, means for defining an optical path for said radiant energy from the source to said reflective element, said means including a penta reflector, a device for limiting the radiation in a direction perpendicular to said first axis, means adjacent said radiation limiting means for coding said radiant energy to establish two distinguishable contiguous portions thereof having a boundary extending therebetween in a direction parallel to said first axis, and radiation-sensitive means having a response correlated to said coding and positioned to receive the reflected energy along said optical path, whereby the output signal of said radiation-sensitive means is indicative of the lateral deviation of said body from a desired position.

7. An optical system for monitoring the position of a body comprising a source of radiant energy, a reflective element affixed to said body, said element being adapted to reflect radiant energy at angles independent of its rotation about a first axis, means for defining an optical path for said radiant energy from the source to said reflective element, said means including a constant deviation reflector, a device for limiting the radiation in a direction perpendicular to said first axis, means adjacent said radiation limiting means for coding said radiant energy to establish two distinguishable contiguous portions thereof having a boundary extending therebetween in a direction parallel to said first axis, and radiation-sensitive means having a response correlated to said coding and aligned with said source in said optical path to receive the energy reflected from said reflective element, whereby the output signal of said radiation-sensitive means is indicative of the lateral deviation of said body from said position of alignment.

8. An optical system for monitoring the position of a body comprising a source of radiant energy, a reflective element affixed to said body, said element being adapted to reflect radiant energy at angles independent of its rotation about a first axis, means for defining an optical path for said radiant energy from the source to said reflective element, said means including a reflector capable of transmitting radiant energy at a constant angular deviation in a plane perpendicular to said first axis, a device for limiting the radiation in a direction perpendicular to said first axis, means adjacent said radiation limiting means for coding said radiant energy to establish two distinguishable contiguous portions thereof having a known state of balance as determined by a boundary therebetween extending in a direction parallel to said first axis, radiation-sensitive means having a response correlated to said coding and positioned to receive the reflected energy returned along said optical path, drive means operably connected to position said constant deviation reflector, and means for actuating said drive means in accordance with the output signal of said radiation-sensitive means to maintain said known state of balance, whereby the adjustment necessary to maintain said balance is a measure of the lateral deviation of said body from a desired position.

9. An optical system for detecting the angular deviation and lateral translation of a body from a desired position comprising a source of radiant energy, first and second reflective elements affixed to said body, said first element being adapted to reflect energy at angles independent of its rotation about a first axis and said second element being adapted to reflect energy along a path parallel to the path by which it reached said element, means for directing said radiant energy from the source to said reflective elements, said means including a device for limiting the radiation in a direction perpendicular to said first axis, means adjacent said radiation limiting means for coding said radiant energy to establish two distinguishable contiguous portions thereof having a boundary extending in a direction parallel to said first axis, first and second radiation-sensitive means positioned to receive the energy reflected from said first and second reflective elements, respectively, the response of both said means being correlated to said coding, whereby the output of said first radiation-sensitive means is a measure of the angular deviation of said body from said desired position and the output of said second radiation-sensitive means is a measure of the lateral translation of said body from said desired position.

10. An optical system for detecting the angular deviation and lateral translation of a body from a desired position comprising a light source, first and second reflective elements affixed to said body, said first element being a roof reflector and having the juncture of its reflective surfaces extending along a first axis and the second element being a retroflector positioned adjacent said first element and displaced therefrom along a second axis normal to said first axis and to the line of sight of light, means for forming light from said source in a beam directed to said reflective elements, said means including a device for limiting the dimension of said beam in a direction parallel to said first axis, means adjacent said dimension limiting means for alternately chopping contiguous portions of said beam to establish a boundary therebetween extending in a second direction parallel to said second axis, first and second means positioned to receive the light reflected from said first and second reflective elements, respectively, for producing signals in accordance with the respective instantaneous intensity of the light so received, means for comparing each of said signals with said beam-chopping frequency for producing respective signals as a function of the phase therebetween, whereby to indicate the angular deviation and lateral translation of said body from said desired position.

11. An optical system for detecting the angular deviation and lateral translation of a body from a desired position comprising a light source, first and second reflective elements affixed to said body, said first element being a roof reflector and having the juncture of its reflective surfaces extending along a first axis and the second element being a retroflector positioned adjacent said first element in a second direction normal to said first axis and to the line of sight of the light, means for forming light from said source in a beam, including a penta reflector and a device for limiting the dimension of said beam in a direction parallel to said first axis, means adjacent said dimension limiting means for alternately chopping contiguous portions of said beam to establish a boundary therebetween extending in said second direction, first and second light-sensitive means for producing signals in accordance with the respective instantaneous intensity of the light impinging thereon, said first light-sensitive means being positioned to receive the light reflected from said first reflective element, said penta reflector being positioned to receive the light reflected from said second reflective element and direct it to said light-sensitive means, first phase comparison means arranged to receive the signal from said first light-sensitive means and a signal synchronous with said beam-chopping for producing a signal as a function of the phase therebetween, first drive means connected to receive the output of said first phase comparison means for positioning said first light-responsive means to maintain a predetermined phase relationship, said positioning being a measure of the rotational deviation of said body from said desired position, and a second drive means connected to receive the output of said second phase comparison means for positioning said penta reflector to maintain a predetermined phase relationship, the positioning adjustment of said penta reflector being a measure of the lateral translation of said body from said desired position.

References Cited in the file of this patent

UNITED STATES PATENTS

| | | |
|---|---|---|
| 2,369,622 | Toulon | Feb. 13, 1945 |
| 2,483,102 | Pierson | Sept. 27, 1949 |
| 2,571,937 | Peck | Oct. 16, 1951 |
| 2,703,505 | Senn | Mar. 8, 1958 |
| 2,819,645 | Koulikovitch | Jan. 14, 1958 |
| 2,821,104 | Mills | Jan. 28, 1958 |
| 2,943,210 | Jones | June 28, 1960 |